Figure 2:
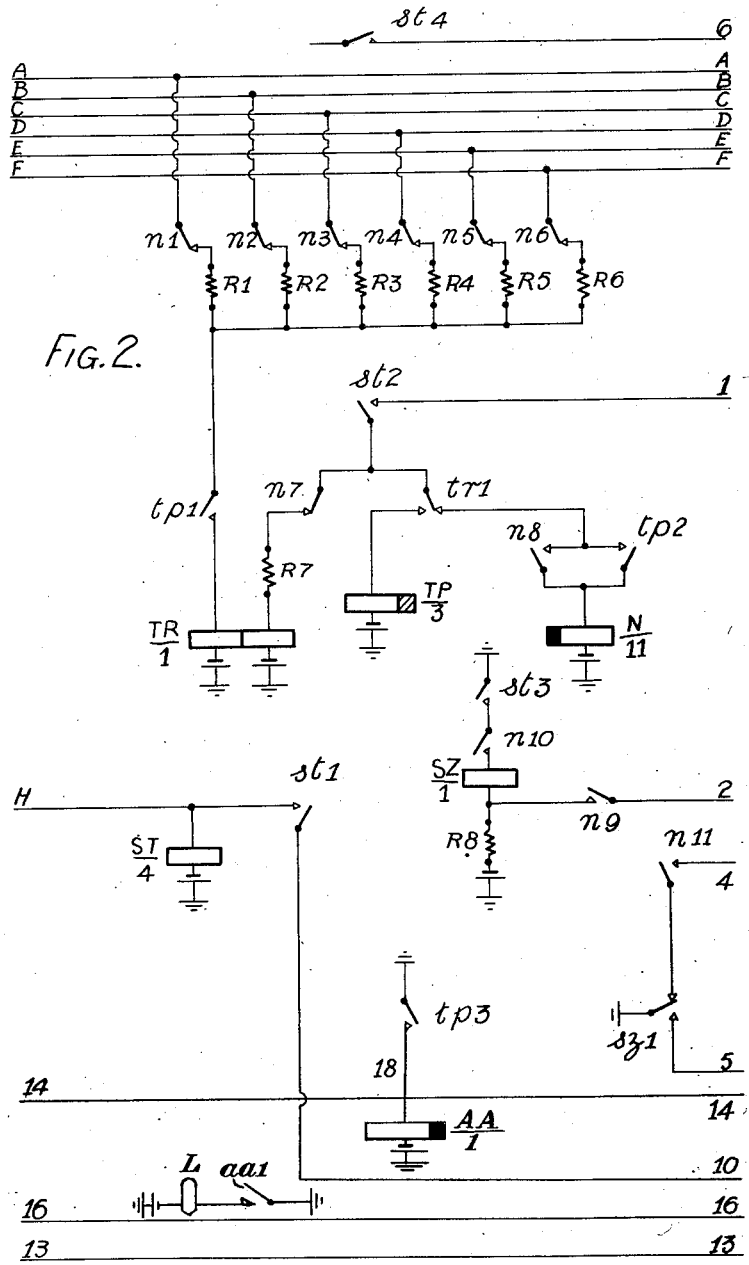

June 18, 1935.  F. LIMB  2,005,151
CONTROL OF SWITCHES IN TOTALIZER SYSTEMS
Filed Dec. 23, 1930  8 Sheets-Sheet 1
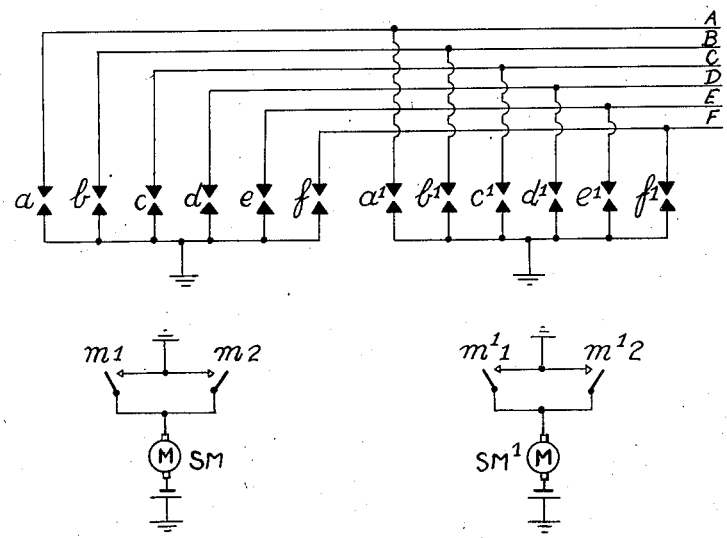
FIG. 1.
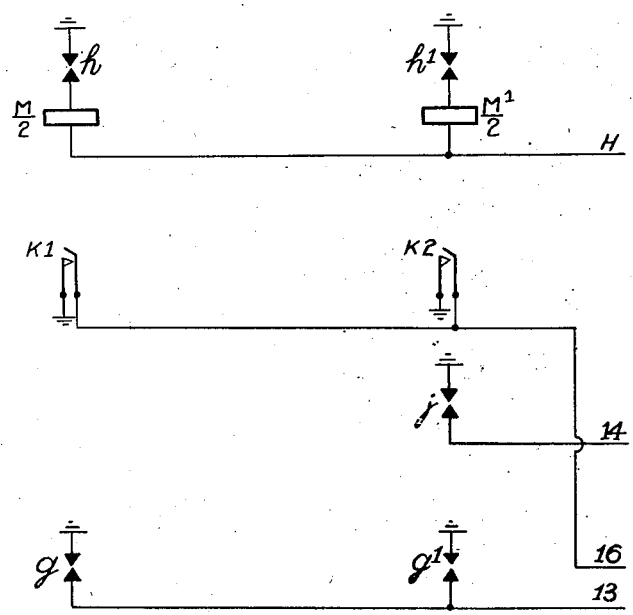
F. Limb
INVENTOR
By: Marks & Clerk
ATTYS.

June 18, 1935. F. LIMB 2,005,151
CONTROL OF SWITCHES IN TOTALIZER SYSTEMS
Filed Dec. 23, 1930 8 Sheets-Sheet 3
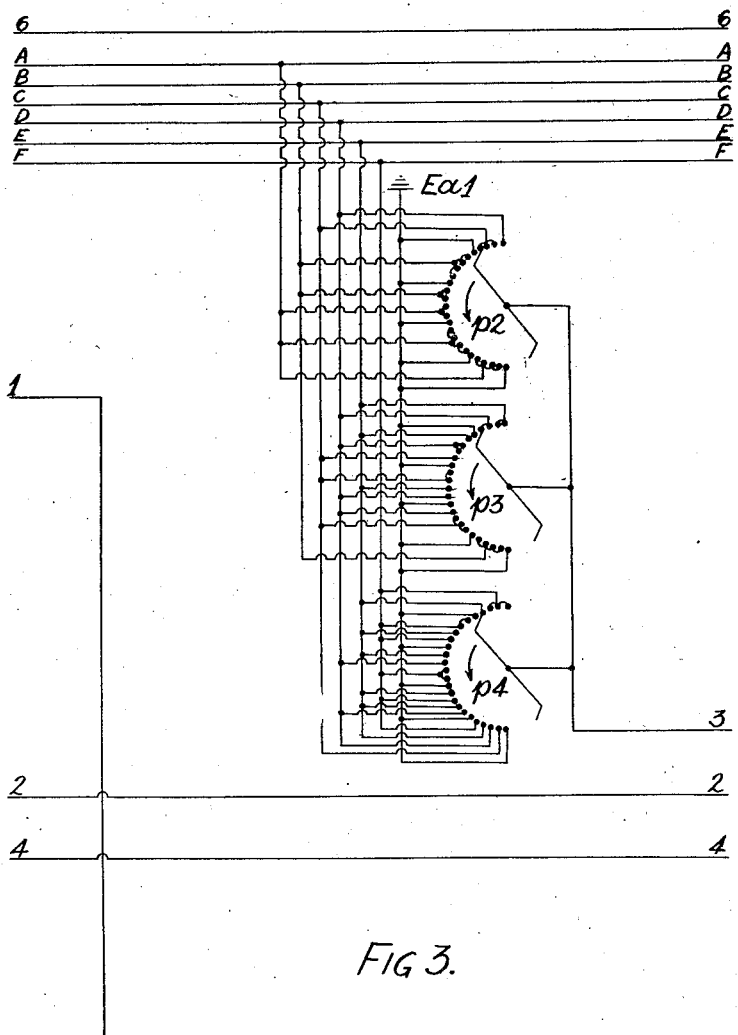
FIG 3.
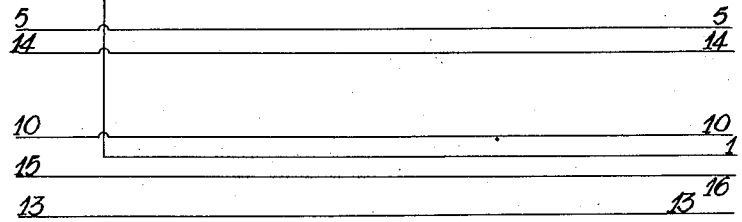

June 18, 1935.   F. LIMB   2,005,151
CONTROL OF SWITCHES IN TOTALIZER SYSTEMS
Filed Dec. 23, 1930    8 Sheets-Sheet 5
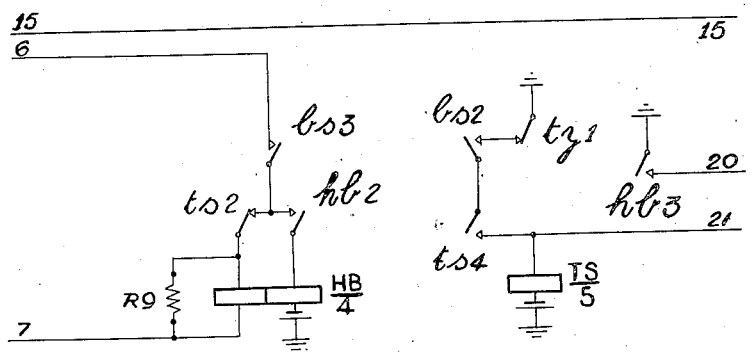
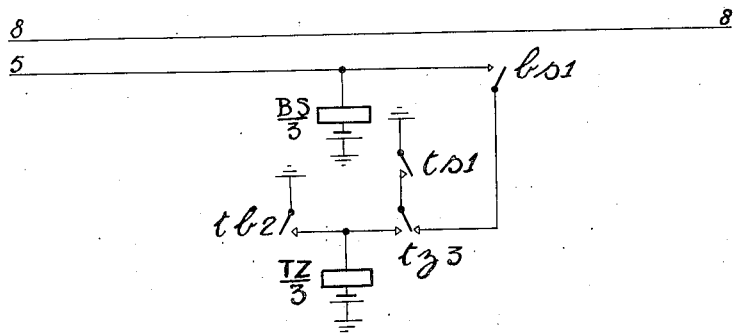
FIG.5.
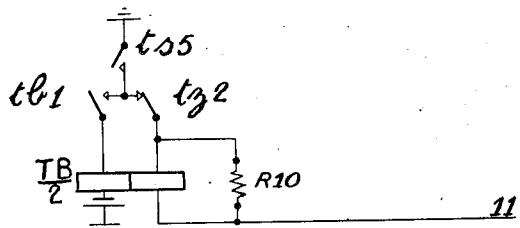
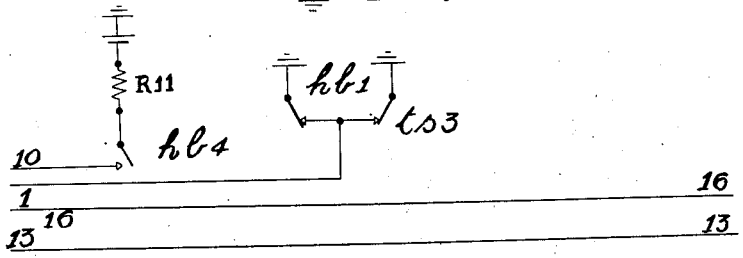
F. Limb
INVENTOR

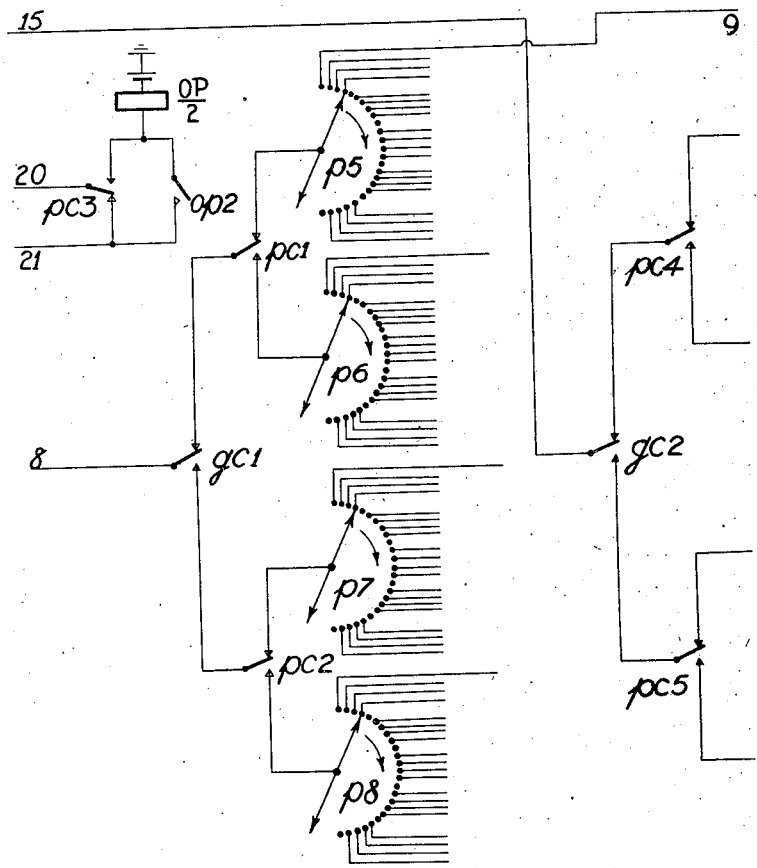
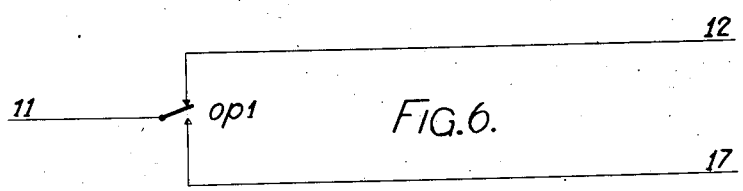
Fig.6.

June 18, 1935.  F. LIMB  2,005,151
CONTROL OF SWITCHES IN TOTALIZER SYSTEMS
Filed Dec. 23, 1930   8 Sheets-Sheet 7

Patented June 18, 1935

2,005,151

UNITED STATES PATENT OFFICE 2,005,151

CONTROL OF SWITCHES IN TOTALIZER SYSTEMS

Frederick Limb, Beeston, England, assignor to Ericsson Telephones Limited, London, England Application December 23, 1930, Serial No. 504,329
In Great Britain January 30, 1930

2 Claims. (Cl. 235—92)

The present invention relates to the control of switches in totalizer systems and has for one of its objects to provide a new and improved method of control combined with economy in wiring between the point of control and the switch or switches that it is desired to control.

In order to effect economies in wiring between the transmitting stations and the central apparatus various methods have been proposed. In one known method the so-called code signalling system is employed in which signals are transmitted on one, two or more of a plurality of conductors leading to a decoder at the central apparatus in different combinations depending upon the particular bet key, or other competitor determining device, operated at the transmitting station. The decoder consists of a plurality of relays associated with the various conductors. According to the code transmitted, a certain combination of relays operates which causes the appropriate totalizer, corresponding to the competitor upon which the bet is made, to register the amount of the bet. Hitherto, one of the disadvantages of the code signalling system has been that a wrong, or a false bet is liable to be registered if, for instance, a fault devolops on any of the conductors upon which the code signals are transmitted According to the present invention in a totalizer system arrangements are provided whereby a bet signal is not accepted unless a fixed number of conductors greater than one is marked.

The term "marking" employed here and throughout the specification means that the potential of the conductor is made different from that of the others or from its normal value. Thus the application of a potential to a conductor marks that conductor or alternatively the removal of a potential from a conductor may similarly mark the conductor if normally it has a potential applied thereto.

According to a feature of the invention, instead of the various conductors being connected to decoding relays they may be connected to banks of a switch adapted to select the appropriate totalizer in accordance with the particular code signal. By this means a number of decoding relays are replaced by a switch and a great economy of apparatus is effected.

According to a further feature of the invention arrangements may be provided whereby operations relative to a subsequent transmission of a signal may be initiated and the circuit to the appropriate individual totalizer prepared before the acceptance of the previous signal by the pool totalizer.

Other features of the invention will be evident from the following description of one manner of carrying it into effect in relation to an electric totalizer system used in public places for totalizing the amount of money received for admission at different entrances, for example, or for totalizing the number or amount of sales to the public or of investments by the public. It should be understood, however, that other methods of carrying out the invention may be adopted without in any way departing from the scope of the invention.

One form of the invention is represented diagrammatically in the accompanying drawings wherein:—

Figure 8:
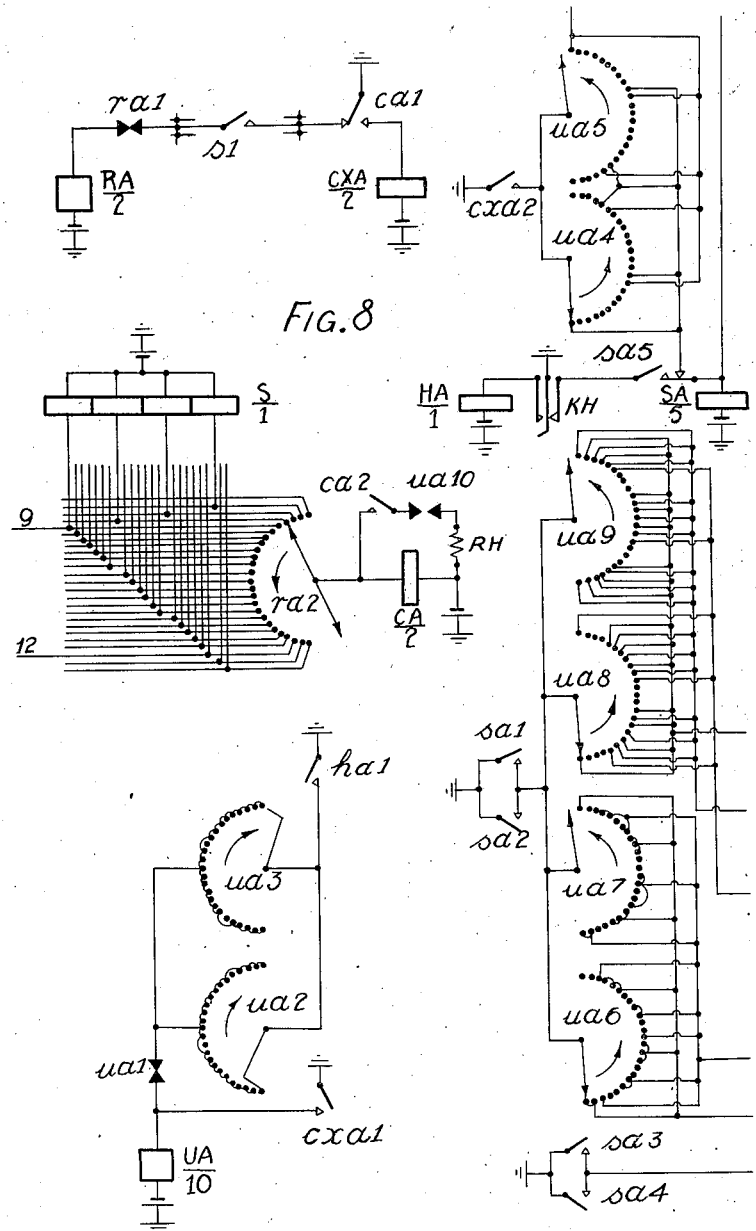

Figure 1 represents the essential portions of the circuits at a signal transmitting station, Figures 2 to 7 (which should be connected together side by side so that Figure 3 comes to the right of Figure 2 and Figure 4 to the right of Figure 3 etc.) represent circuit arrangements for connecting the signal transmitting stations to a centralized registering apparatus, and Figure 8 represents the circuit of a registering device situated at a centralized office.

Referring now to the drawings,

Figure 1 shows the circuit arrangements at a registration signal transmitting station having two ticket machines for transactions specified by the Nos. 1 to 40 inclusive, and Nos. 41 to 80 inclusive, respectively, for controlling the central apparatus. Contacts $a$, $b$, $c$, $d$, $e$ and $f$ are associated with conductors A, B, C, D, E and F respectively and are closed in combinations of three at a time whenever a signalling key at the ticket machine for Nos. 1 to 40 is operated. Similarly contacts $a^1$, $b^1$, $c^1$, $d^1$, $e^1$ and $f^1$ are also associated, respectively, with the same conductors and are closed in combinations of three at a time whenever a key at the ticket machine for Nos. 41 to 80 is operated. Contact $g$ is an additional contact that is closed only when a key associated with one of the Nos. 21 to 40 inclusive is operated. Similarly $g^1$ is a contact that is closed only when a key associated with one of the Nos. 61 to 80 inclusive is operated. Contact $h$ is closed when any key of the machine relative to Nos. 1 to 40 inclusive is operated and contact $h^1$ is closed when any key of the machine relative to Nos. 41 to 80 inclusive is operated.

Figures 3 to 7 inclusive show the circuit of switches and relays at the central office by means of which a signal is directed to the appropriate totalizing apparatus.

Figure 8 shows the circuit of a registering switch and associated apparatus for counting the signals at the central office.

The arrow pointed wipers such as $p5$, $p6$, $p7$ and $p8$ (Figure 6) represent wipers of the non-bridging type that is to say wipers which do not bridge over successive contacts when they pass from one contact to another. On the other hand wipers similar to those represented by $p2$, $p3$ and $p4$ (Figure 3) bridge over successive contacts as each step is taken. Switches P and Q have double ended wipers the same 25 contacts being wiped over twice during one revolution of the switch. Switch UA (Figure 8) is shown having single ended wipers arranged in pairs so that contacts are wiped over by each wiper of a pair in succession. This switch thus has 50 different positions.

The detail of circuit operations will now be described and the various drawings should be arranged in order so as to facilitate tracing the various circuits; thus Figure 2 should be placed on the right of Figure 1, Figure 3 on the right of Figure 2 and so on. Relays and switches are designated by capital letters that are placed on the drawings near their relative operating coils. Contacts are shown detached from their operating coils and are designated by small letters. The number of movable contacts on each relay or switch is shown by the numeral under its designation, thus $$\frac{CO}{3}$$

(Figure 4) denotes that relay CO has three movable contacts that are designated $co1$, $co2$ and $co3$;

$$\frac{P}{8}$$

denotes that switch P has eight movable contacts, one, an interrupter contact, is designated $p1$, and others, which are wipers, are designated $p2$ to $p8$ inclusive. These wipers will be found on Figures 3 and 6.

It will be assumed that an investment is made in connection with a transaction specified by a number between 1 and 20 inclusive and that an operator depresses a key associated with that transaction thereby causing earth potential to be applied to conductors A, B and C by closing contacts $a$, $b$ and $c$. The way various combinations of contacts are closed by the operation of different keys will not be described as it forms no part of the present invention. A description of such apparatus will be found in the specification of British Patent No. 345,307 dated December 20th, 1929.

Upon the closure of contact $h$, owing to the operation of a key, relay ST operates in a circuit from earth, contact $h$, relay M, conductor H, relay ST (Figure 2), to battery. Relay M does not operate owing to the relatively high resistance of relay ST. Contact $st2$ closes a circuit from earth, contacts $ts3$ and $hb1$ (Figure 5) in parallel, conductor 1, contacts $st2$ and $n7$ (Figure 2) resistance R7, right-hand winding of relay TR to battery.

Relay TR operates and contact $tr1$ extends the earth potential on conductor 1 to battery by way of relay TP. Relay TP operates and contact $tp1$ connects the left-hand winding of relay TR to the earth potential on conductors A, B and C by way of resistances R1, R2 and R3 in parallel.

Resistances R1 to R6 inclusive are all equal and are such that the effect of the current, passing through three resistances in parallel, in series with the left-hand winding of relay TR, equals that of the current flowing through the right-hand winding. This relay is, however, wound differentially and it will therefore release and thus open the circuit of relay TP at contact $tr1$. Relay TP releases slowly but is designed to allow sufficient time for relay N, which is slightly slow to energize, to operate in a circuit from the earth potential on conductor 1 by way of contacts $st2$, $tr1$ and $tp2$, relay N to battery. Once operated, relay N locks independently of contact $tp2$ by way of contact $n8$.

Contacts $n1$, $n2$ and $n3$ open the circuit of the left-hand winding and contact $n7$ opens that of the right-hand winding of relay TR to prevent further operation of this relay.

Contact $n10$ closes a circuit from earth, contacts $st3$ and $n10$, relay SZ, resistance R8 to battery. Relay SZ will not operate, however, when combination switch P is in the position shown, as relay SZ is short-circuited by way of contact $n9$, conductor 2, contact $co1$ (Figure 4), conductor 3, wiper $p2$ (Figure 3) to the earth on conductor C. Contact $n11$ (Figure 2) closes a circuit for switch P from earth, contacts $sz1$ and $n11$, conductor 4, contact $co2$ (Figure 4), interrupter contact $p1$, the magnet of switch P to battery. Switches P and Q are preferably of the well-known telephone type which advance their wipers upon release of their controlling magnet. A description of such a switch will be found for example in the specification of U. S. Patent No. 1,693,027. The magnet of switch P energizes and opens interrupter contact $p1$, thereby causing the magnet to release and move the wipers forward one step. Relay SZ is then short-circuited by way of wipers $p2$, $p3$ and $p4$ in parallel to the earth at $Ea1$ and therefore still remains unoperated. When interrupter contact $p1$ closes, after the release of the magnet of switch P, the magnet again operates, opens its own circuit and moves the wipers forward another step. Relay SZ is now short-circuited by way of wiper $p2$ to the earth on conductor B. So long as relay SZ remains unoperated switch P continues to drive in the manner described.

In the particular example chosen, that is, on the assumption that conductors A, B and C are earthed by the operation of the chosen key at the transmitting station and the initial position of switch P being in the position arbitrarily indicated in the drawings, relay SZ is short-circuited in various positions of the switch by way of one or more of the wipers $p2$, $p3$ and $p4$ either to the earth potential on one of the conductors A, B or C, or to the earth at $Ea1$ until the switch has reached the first contact in each respective level of contacts. There is then no short-circuiting earth for relay SZ, which therefore can now operate and open the driving circuit of switch P at contact $sz1$ and closes a circuit from earth, contact $sz1$, conductor 5, relay BS (Figure 5) to battery. The switch therefore remains on the first contacts and relay BS operates.

Wipers $p2$, $p3$ and $p4$ are of the bridging type in order that there may be no interruption of the earth potential on conductor 2 during their rotation until the required position, at which the switch has to stop, has been reached. This ensures that relay SZ will not operate prematurely or interfere with the drive circuit of switch P or Q through repeated momentary fluxing of its core at each step.

The following table gives the various switch positions in the first column and the conductors in the second column any of which if earthed, during the searching operation of the switch, cause it to step on to the next position. The third column gives the combination of conductors which must not be earthed in order that the switch may stop in the corresponding position in the first column. It will be noted that the switch cannot stop in positions 5, 10, 15, 20 and 25 as these are permanently earthed.

| Switch position | Conductors which, if earthed step switch | Combination on which wipers rest |
| --- | --- | --- |
| 1 | A B C | D E F |
| 2 | A B D | C E F |
| 3 | A B E | C D F |
| 4 | A B F | C D E |
| 5 | No rest | Common earth |
| 6 | A C D | B E F |
| 7 | A C E | B D F |
| 8 | A C F | B D E |
| 9 | A D E | B C F |
| 10 | No rest | Common earth |
| 11 | A D F | B C E |
| 12 | A E F | B C D |
| 13 | B C D | A E F |
| 14 | B C E | A D F |
| 15 | No rest | Common earth |
| 16 | B C F | A D E |
| 17 | B D E | A C F |
| 18 | B D F | A C E |
| 19 | B E F | A C D |
| 20 | No rest | Common earth |
| 21 | C D E | A B F |
| 22 | C D F | A B E |
| 23 | C E F | A B D |
| 24 | D E F | A B C |
| 25 | No rest | Common earth |

A signalling circuit is now completed to the individual totalizer from earth, contact *st4* (Figure 2), conductor 6, contacts *bs3* and *ts2* (Figure 5), left-hand winding of relay HB in parallel with resistance R9, conductor 7, contact *co3* (Figure 4), conductor 8, contacts *gc1* and *pc1* (Figure 6), wiper *p5*, conductor 9, a winding of relay S (Figure 8) to battery. Relay S operates but relay HB does not receive sufficient current to operate. If wiper *ra2* is not on a contact associated with conductor 9 a circuit is closed from earth, contacts *ca1*, *s1* and *ra1*, magnet of receiving switch RA to battery. The receiving switch is thus driven round under the influence of interrupter contact *ra1* until wiper *ra2* encounters a marked contact such as the one associated with conductor 9 when a branch of the previously traced circuit is extended by way of wiper *ra2* to relay CA and battery. Relay CA operates but relay HB still does not receive sufficient current to operate. Contact *ca1* opens the circuit of the magnet of switch RA to prevent further stepping and completes an obvious circuit for relay CXA. Relay CXA operates and completes at contact *cxa1* a circuit for the magnet of registering switch UA.

Should the investment under consideration be the first investment set up for the particular transaction, contact *cxa2* completes a circuit for relay SA from earth, contact *cxa2*, wiper *ua4*, contact *sa5*, relay SA to battery. Relay SA operates and locks by way of contact *sa5* to the earth at key KH during the time investments are in progress.

The closure of contact *ua10* shunts relay CA by a resistance, RH. This resistance is not low enough to cause the release of relay CA, but the combined resistance of RH, relay CA and the winding of relay S in parallel allows sufficient current through relay HB (Figure 5) to cause it to operate.

Contact *hb2* closes a circuit for the right-hand winding of relay HB to hold it operated independently of contact *ts2*. Contact *hb3* closes a circuit from earth, contact *hb3*, conductor 20, contact *pc3*, conductor 21, relay TS (Figure 5) to battery. Relay TS operates. Contact *hb4* closes a circuit from battery, resistance R11, conductor 10, contact *st1* (Figure 2), conductor H, relay M (Figure 1), contact *h* to earth. Relay M therefore receives current both by way of relay ST and resistance R11 and the increased current causes it to operate whereupon contacts *m1* and *m2* close the operating circuit of motor SM of the ticket machine mechanism.

Relay TS (Figure 5) is held operated from earth, contacts *tz1*, *bs2*, *ts4*, relay TS to battery. Contact *ts1* holds relay BS operated by way of contacts *tz3* and *bs1* independently of contact *sz1* (Figure 2). Contact *ts3* removes the earth on conductor 1, contact *hb1* being already opened.

Contact *ts2* opens the previously traced signalling circuit leading to the individual totalizer thereby causing relays S, CA and CXA (Figure 8) to release but relay HB (Figure 5) remains held by way of its right-hand winding. The magnet of switch UA (Figure 8) then releases and moves its wipers forward one step. This switch is similar to switches P and Q and a description of switches of this kind will be found in the specification of U. S. Patent No. 1,693,027. Appropriate circuits are then closed from the earth at contacts *sa3* and *sa4* and at contacts *sa1* and *sa2* by way of certain of the wipers *ua6* to *ua9* inclusive to apparatus for controlling the indicator. It is not thought necessary to describe this apparatus nor the method of transferring registration and indication of investments from one denomination to a higher denomination as they are not subjects of the present invention.

The operation of relay TS (Figure 5) also causes a circuit to be closed from earth, contacts *ts5* and *tz2*, right-hand winding of relay TB in parallel with resistance R10, conductor 11, contact *op1* (Figure 6), conductor 12 to the pool totalizer. This apparatus may be identical to that of the individual totalizer. Figure 8 may therefore be used again to trace the circuit operations but it should be understood that a separate equipment must be provided for each totalizer. A relay identical to relay S associated with conductor 12 in the pool totalizer operates in series with relay TB (Figure 5). Relay TB is similar to relay HB, that is, it does not operate until the signalling circuit has been extended to the registering switch, UA (Figure 8) and then only when the magnet of this switch has shunted relay CA by the closure of contact *ua10* as previously described. It is thus assured that relay TB does not operate until the pool totalizer accepts the signal. After acceptance relay TB operates and locks from earth, contacts *ts5* and *tb1*, left-hand winding of relay TB to battery.

Contact *tb2* closes an obvious circuit for relay TZ. Contact *tz2* opens the circuit leading to the pool totalizing apparatus causing the release and advance of the registering switch and the release of the associated relays.

The operation of the ticket machine mechanism causes the issue of a ticket on the required transaction in a known manner and the release of contact *h* (Figure 1) and the combination contacts $a$, $b$ and $c$, which it has been assumed are operated in particular example being described.

Relays M and ST, release and the former opens the circuit of the ticket machine operating mechanism at contacts $m1$ and $m2$. Contact $st2$ (Figure 2) opens the circuit of relay N, contact $st3$ opens the circuit of relay SZ and contact $st4$ opens the holding circuit of relay HB. Relays N, SZ and HB release. Contact $hb3$ opens the circuit of relay TS. Relay TS releases and contact $ts5$ opens the circuit of relay TB. Relay TB releases and contact $tb2$ opens the circuit of relay TZ. Relay TZ then releases and all apparatus is at normal.

The circuit arrangements are designed to prevent a second signal from being registered before the previous one has been registered by both the individual and pool totalizers. The ticket machines are arranged so that only one key can be operated at a time and once operated they remain locked until the ticket machine has nearly completed the ticket printing and issuing operation. Such ticket machines are quite well known and a description thereof may be found for example in British Patent Specification No. 289,901, dated November 2nd, 1926. It may happen however that a key is released and a second key depressed before registration of the pool is effected. From the previous description it follows that relay M (Figure 1) cannot start the ticket machine until the individual totalizer accepts the signal and relay HB (Figure 5) operates and closes contact $hb4$. Relay BS, which operates subsequently to the operation of relay SZ when the combination switch stops searching, remains operated if the pool totalizer has not accepted the signal and holds relay TS operated. Relays ST, M, N and HB release as before. The relays remaining operated owing to the pool totalizer not yet having accepted the signal are BS and TS. If now a second key be depressed operations take place as previously described up to the point of the combination switch finding the appropriate resting position and the consequent operation of relay SZ. The signal cannot, however, be extended to the individual pool totalizer owing to the signal lead being opened at contact $ts2$. No further change can take place until the pool totalizer accepts the signal, the relays operated at this point being ST, N, SZ, BS and TS.

When the pool totalizer eventually accepts the signal relays TB and TZ operate in turn. Contact $tz1$ opens the circuit of relay TS so that this relay is no longer held. Contact $ts1$ opens the locking circuit of relay BS but this relay is once more held by way of the earth on conductor 5. The relapse of contact $ts2$ now completes the circuit to the individual totalizer and operations take place as subsequently described.

In the case of an investment in connection with a transaction specified by a number between 21 and 40 inclusive, contact $g$ (Figure 1) is closed when a key is operated in addition to contact $h$ and three of the combination contacts. Contact $g$ earths conductor 13 thereby causing relay GC (Figure 6) to operate. Subsequent operations take place which are similar to those already described except that conductor 8 is now extended by way of contacts $gc1$ and $pc2$ to wiper $p7$ and thence to the appropriate individual totalizer depending upon the position taken by switch P. Relay GC releases when contact $g$ opens which takes place when the bet key is released.

Figure 4:
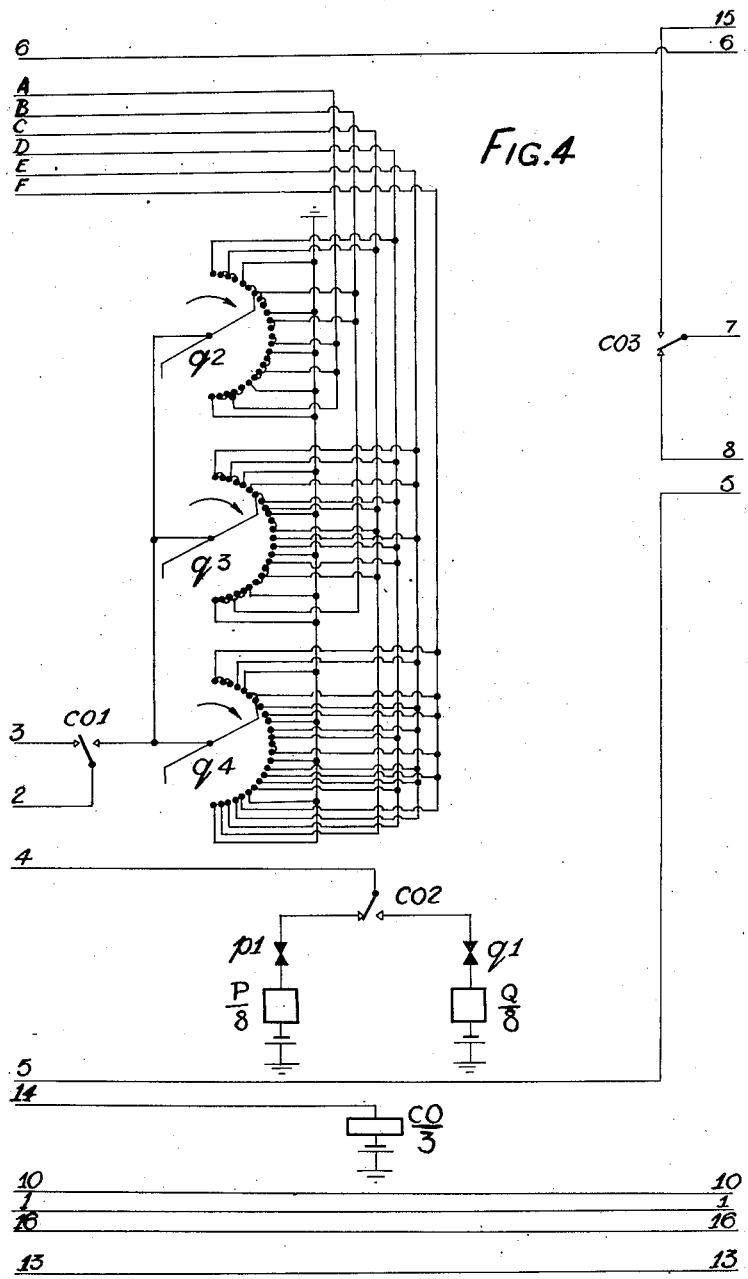
Figure 7:
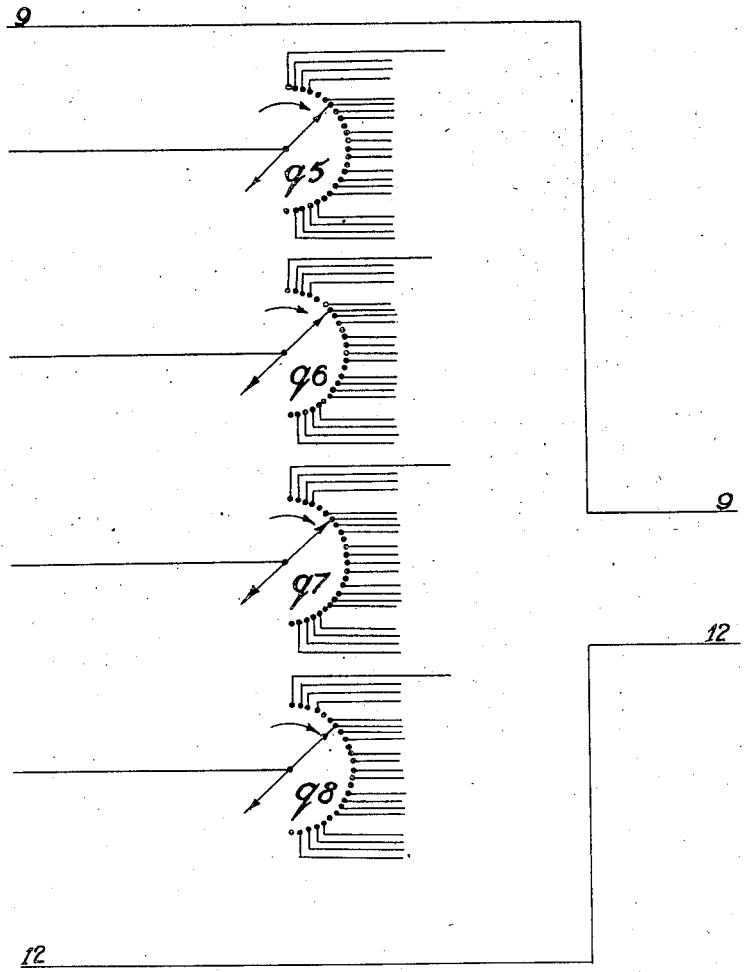

In the case of an investment for a number between 41 and 60, inclusive, the signal is made from the second machine although it will be understood that if preferred one machine may be provided which can cope with signals in connection with all the transactions. Contacts $h^1$ and three of the combination contacts $a^1$, $b^1$, $c^1$, $d^1$, $e^1$ and $f^1$ are closed as in the case of a key being operated for one of the numbers 1–40 inclusive. The principle of the operations that take place is similar to those previously described but in this case relay $M^1$ operates upon acceptance of the signal by the individual totalizer instead of relay M and causes the operation of motor $SM^1$ of the second machine and the printing and issuing of the ticket by that machine. Also contact $j$ is closed and earths conductor 14. This causes the operation of relay CO (Figure 4).

Contact $co2$ changes over the connections on conductor 4 from the magnet of switch P to the magnet of switch Q so that switch Q is caused to find the appropriate position corresponding to the combination selected by the key. Contact $co1$ changes over so that conductor 2 is now transferred to wipers $q2$, $q3$ and $q4$. These wipers are connected in a similar manner to wipers $p2$, $p3$ and $p4$, respectively, so that switch Q continues to step until a position is found in which there is no short-circuiting earth for relay SZ.

Contact $co3$ changes over signal conductor 7 from conductor 8 to conductor 15 so that the signal is extended to the appropriate individual totalizer for one of the numbers 41 to 60 inclusive by way of the latter conductor. The operation of the various relays is thus similar to the previous description except that relay CO remains operated until contact $j$ is opened during the ticket issuing operations.

In the case of an investment for a number between 61 and 80 inclusive contact $g^1$ (Figure 1) is closed in addition to the other contacts that are closed as a result of an operation of the key. Contact $g^1$ earths conductor 13 resulting in the operation of relay GC (Figure 6). Contact $gc2$ changes over the connection of conductor 15 by way of contacts $gc2$, $pc5$ and wiper $q7$ to the appropriate individual totalizer for one of the transactions 61 to 80 inclusive the circuit operations being otherwise similar to the case of an investment for numbers 41 to 60 inclusive, except that contact $g^1$ is opened and relay GC releases during the ticket issuing operation.

If it is desired to make a different kind or form of investment on any of the transactions, key K1 or K2 is operated, dependent upon whether a signal is to be transmitted from the first or second machine respectively, prior to the operation of the signalling key. The closure of either of the keys K1 or K2 earths conductor 16 resulting in the operation of relay PC (Figure 6).

Contact $pc1$ changes over the connection of conductor 8 from wiper $p5$ to wiper $p6$ so that an investment of this kind in one of the transactions 1 to 20 inclusive will be accepted by the appropriate individual totalizer which is associated with one of the outlets corresponding to wiper $p5$. Similarly, in the case of such a modified investment in connection with one of the transactions 21 to 40 inclusive, it will be accepted by the appropriate individual totalizer associated with one of the outlets corresponding to wiper $p8$ owing to the operation of contacts $pc2$ and $gc1$. Similarly modified investments in connection with numbers 41 to 60 and 61 to 80 are accepted by their appropriate individual totalizers by way of change over contacts *pc*4 and *pc*5 respectively, the corresponding totalizers being connected to the outlets associated with wiper *q*6 for transactions 41 to 60 inclusive and with wiper *q*8 for transactions 61 to 80 inclusive.

The key for modified investments remains operated until the operation of the ticket machine causes the release of the signalling key. The signalling key, which is operated after the modified investment key, causes circuit operations to take place which are fundamentally similar to those already described except upon the operation of relay HB (Figure 5) which takes place upon the acceptance of the signal by the individual totalizer of modified investments a circuit is closed from earth, contact *hb*3, conductor 20, contact *pc*3 (Figure 6) relay OP to battery. Relay OP operates and contact *op*2 extends the earth on conductor 20 to relay TS (Figure 5). Relay TS, which immediately operates after the operation of relay HB in the case of a normal investment cannot so operate in the case of a modified investment because its circuit is opened at contact *pc*3. In the latter case, however, it operates immediately after relay OP. Contact *op*2 also holds relay OP operated by way of the earth on conductor 21 should relay HB release before the pool totalizer for modified investments has not accepted the signal.

Contact *op*1 changes over the connection of conductor 11 from conductor 12 to conductor 17. This conductor leads to the pool totalizer for modified investments.

When the modified investment key is finally released, during the operation of the ticket machine, the earth is removed from conductor 16 resulting in the release of relay PC. The relapse of contact *pc*3 opens the circuit of relay OP. The latter relay will therefore release unless the place pool totalizer for modified investments has not accepted the signal. In the latter case it is held by way of the earth on conductor 21. Upon the eventual acceptance of the signal by the pool totalizer for modified investments and the consequent operation of relay TZ, relay OP will release owing to the removal of earth on conductor 21 by contact *tz*1 (Figure 5).

If it should happen that either fewer or more than three of the conductors A to F, inclusive, are earthed when a signalling key is operated due to a fault, as, for instance, a disconnected or permanently earthed conductor, differential relay TR will remain operated consequent upon the closure of contact *tp*1. This is because the effect of the current in the windings of relay TR will be unbalanced. This relay TR is of the ordinary differential type such as described for example in "Telephony" by McMeen & Miller (American Technical Society, Chicago), revised edition, page 143, paragraph 2 and the following paragraph. If, for instance, too few conductors are earthed too little current will flow in its left-hand winding; if too many conductors are earthed there will be too much current in the left-hand winding in order to neutralize the effect of current flowing in the right-hand winding. Relay TR may momentarily release but it will reoperate (while the flux is building up in the opposite direction) before relay N has time to operate. The non-operation of relay N prevents the normal circuit operations from taking place. The signal therefore, is prevented from being extended to the totalizers and the ticket machine from issuing a ticket. Further, the circuit for relay TP remains completed and therefore contact *tp*3 permanently connects earth to conductor 18. For a sufficiently long time for fault relay AA to operate the contact *aa*1 to close the circuit of alarm lamp L relay AA is made slow to operate so that it does not bring in the alarm upon the momentary operation of relay TP under normal conditions.

In the particular arrangement described the number of conductors marked must be neither less nor more than a definite fixed number in order that a signal may be accepted. If it be desired to allow a signal to be accepted when a variable number of conductors is marked and yet prevent acceptance if the number marked is less than a certain minimum the circuit arrangements may be modified accordingly. For example, the circuit may be modified so that the acceptance of a signal is made dependent upon the operation of relay TR instead of its release. Relay TR in this case would be designed so that it would operate if three or more of the conductors A, B, C, D, E, or F were earthed, but not operate if less than three of the conductors were earthed. If relays are used instead of switches for accepting combination signals and causing the appropriate totalizers to be associated with the transmitting stations, the relay contacts may be so arranged that a circuit to cause the acceptance of the signal is completed only if the number of conductors that are marked is correct.

I claim:

1. A totalizer system comprising a plurality of conductors leading from a transmitting station to receiving apparatus, impulse transmitting contacts whereby a plurality of circuits are closed over certain of the said conductors in combination, each of the said contacts closing one and only one of the said circuits, registering means, controlling means for causing an impulse to be transmitted to the said registering means, and current-operated means having one winding in circuit with the said conductors and another winding energized in a local circuit whereby the said controlling means are caused to operate when a prearranged number of the said circuits are closed and prevented from so doing if any other number of the said circuits are closed.

2. A totalizer system comprising a plurality of conductors leading from a transmitting station to receiving apparatus, impulse transmitting contacts for marking certain of the said conductors in combination, each of the said contacts marking one and only one of the said conductors, registering means, a controlling relay for causing an impulse to be transmitted to the said registering means, and a differential relay having one winding in circuit with the said conductors, and another winding in a circuit controlled by the said transmitting station, whereby the said controlling relay is caused to operate when and only when a prearranged number of the said conductors are marked in combination.

FREDERICK LIMB.